UNITED STATES PATENT OFFICE.

RAYMOND VIDAL, OF PARIS, ASSIGNOR TO LA SOCIÉTÉ ANONYME DES MATIÈRES COLORANTES ET PRODUITS CHIMIQUES DE ST. DENIS ET RAYMOND VIDAL, OF ST. DENIS, (SEINE,) FRANCE.

PROCESS OF TREATING SULFUR COMPOUNDS OF AROMATIC SERIES WITH SULFITES.

SPECIFICATION forming part of Letters Patent No. 549,036, dated October 29, 1895.

Application filed March 15, 1895. Serial No. 541,921. (No specimens.)

*To all whom it may concern:*

Be it known that I, RAYMOND VIDAL, a citizen of the Republic of France, residing at Paris, France, have invented certain new and useful Improvements in Processes for Obtaining Combinations of Alkaline Sulfites and Sulfurated Tinctures Soluble in Water and Suitable for Dyeing and Printing, as fully described in the following specification.

By the combined action of sulfur and alkalies upon a great number of substances certain brown coloring-matters have been obtained, known under the general trade-name of "Cachou de Laval," which coloring-matters are of a constitution yet undetermined, and to which Witt gave the name of "mercaptoacids," ("mercaptosäure.") More recently the same reaction applied to bisubstituted bodies of the aromatic series have given rise to coloring-matters of great technical value by reason of their variety of shades. These coloring-matters, whatever be their origin, all have similar properties. They are insoluble in the usual solvents, (alcohol, ether, and benzine,) and insoluble also in diluted acids. They are, however, easily dissolved in the alkalies and the alkaline sulfids, with a characteristic coloration of bottle-green. Lastly, they possess the very valuable property of dyeing non-mordanted vegetable fiber in shades of color of extraordinary solidity.

As an example of the matters that may be treated by the process constituting the present invention, reference may be made to my United States Patent No. 532,484, dated January 15, 1895.

To utilize these coloring-matters in dyeing and printing without employing any alkaline solution, and particularly without sulfureted alkaline solutions, is the object of this invention.

I have succeeded in obtaining veritable soluble combinations by treating these coloring-matters, precipitated from their solutions by an acid, with alkaline sulfites or bisulfites, the combinations thus obtained being capable of utilization directly in dyeing or printing, with the addition of a thickening agent.

One of the coloring-matters obtained by the action of sulfur and the alkalies upon the bisubstituted bodies of the aromatic series—for instance, that which is obtained by heating the para-amido phenol with sulfur and caustic soda at 180° centigrade—will be brought about to the form of paste containing twelve to fifteen per cent. of the dry product. One hundred kilos of this paste is treated with from forty-five to sixty kilograms of crystallized sulfite of soda, and in the course of three days the solution is complete. The product may thus, as in the former example, be used directly or may be dried and powdered for consumption.

I do not claim herein specifically the treatment of "Cachou de Laval," reserving that specific process to another application, filed June 12, 1895, Serial No. 552,567.

The new coloring-matters are not only distinguished by their perfect solubility in cold water and in presence of acids, but also by the fact that if heated to ebullition in presence of acids they are decomposed and give rise to the bodies from which they were engendered.

Having thus described my invention, what I claim as new, and desire to secure by Letters Patent, is—

1. The herein described process of producing soluble combinations capable of use for dyeing and printing, which process consists in treating with an alkaline sulfur compound as specified, the coloring matters hereinbefore specified obtained by the action of sulfur upon bodies of the aromatic series, which coloring matters are characterized by insolubility in acids and solubility (coloring the solution bottle green) in alkalies and alkaline sulfids.

2. The described process of treating the products of the reaction of sulfur upon the substituted amines of the benzene series with an alkaline sulfite or bisulfite, substantially as set forth.

3. The soluble coloring matters herein described obtained by treatment with alkaline sulfite of the insoluble coloring matters hereinbefore specified (such as those derived from bisubstituted bodies of the aromatic series), the said products being characterized by solubility in water and in acids, by being capable of use directly in dyeing and printing, and by decomposing upon being heated to
5 ebullition in presence of an acid, substantially as described.

In testimony whereof I have signed this specification in the presence of two subscribing witnesses.

RAYMOND VIDAL.

Witnesses:
CLYDE SHROPSHIRE,
EDOUARD BARBARY.